United States Patent
Vossen et al.

(10) Patent No.: US 10,370,226 B2
(45) Date of Patent: Aug. 6, 2019

(54) FAST ACTING COMPRESSIBLE STOP

(71) Applicant: MANITOWOC CRANE COMPANIES, LLC, Manitowoc, WI (US)

(72) Inventors: Stephen Anthony Vossen, Manitowoc, WI (US); Jonathan Michael Borlee, Green Bay, WI (US); Joel David Zick, Newton, WI (US); Timothy James Albinger, Manitowoc, WI (US)

(73) Assignee: MANITOWOC CRANE COMPANIES, LLC, Manitowoc, WI (US)

( * ) Notice: Subject to any disclaimer, the term of this patent is extended or adjusted under 35 U.S.C. 154(b) by 0 days.

(21) Appl. No.: 15/735,471

(22) PCT Filed: Jun. 10, 2016

(86) PCT No.: PCT/US2016/036951
§ 371 (c)(1),
(2) Date: Dec. 11, 2017

(87) PCT Pub. No.: WO2016/201270
PCT Pub. Date: Dec. 15, 2016

(65) Prior Publication Data
US 2018/0155165 A1 Jun. 7, 2018

Related U.S. Application Data
(60) Provisional application No. 62/174,899, filed on Jun. 12, 2015.

(51) Int. Cl.
*B66C 23/92* (2006.01)
*F16F 9/06* (2006.01)

(52) U.S. Cl.
CPC .............. *B66C 23/92* (2013.01); *F16F 9/065* (2013.01); *F16F 9/067* (2013.01); *F16F 2230/24* (2013.01)

(58) Field of Classification Search
CPC ... B66C 23/92; F16F 9/34; F16F 9/065; F16F 9/067; F16F 2230/24; Y10T 137/1692–1752
(Continued)

(56) References Cited

U.S. PATENT DOCUMENTS
3,059,622 A 10/1962 Sexauer
3,326,546 A * 6/1967 Otto ........................ F16F 9/062
267/64.15
(Continued)

FOREIGN PATENT DOCUMENTS
EP 0074705 A1 3/1983
EP 2253577 A1 11/2010
EP 2253577 A1 4/2017

OTHER PUBLICATIONS
International Search Report for PCT/US2016/036951, dated Oct. 19, 2016 (European Patent Office/Office of First Examination).
(Continued)

*Primary Examiner* — Michael R Mansen
*Assistant Examiner* — Juan J Campos, Jr.
(74) *Attorney, Agent, or Firm* — Ramey & Schwaller, LLP; Craig Buschmann

(57) ABSTRACT

A compressible stop for use in a crane has a housing, a rod slidably mounted within the housing, a floating piston, and a valve assembly. The floating piston divides the housing into a gas portion biasing the floating piston towards an end of the housing and a liquid portion containing a hydraulic fluid. The valve assembly divides the liquid portion into a support portion and a reserve portion. The valve assembly
(Continued)

includes a check valve allowing a liquid to flow from the reserve portion into the support portion, a pressure sensitive valve inhibiting the liquid from flowing from the support portion into the reserve portion unless the pressure is above a threshold pressure, and a frangible divider configured to rupture when the liquid pressure exceeds a rupture pressure.

19 Claims, 7 Drawing Sheets

(58) Field of Classification Search
USPC .......... 188/322.15, 322.13; 137/68.19–68.28
See application file for complete search history.

(56) References Cited

U.S. PATENT DOCUMENTS

| | | | |
|---|---|---|---|
| 3,801,087 A | 4/1974 | Akaike et al. | |
| 3,865,356 A * | 2/1975 | Wossner | B60R 19/32 188/269 |
| 4,647,026 A * | 3/1987 | Siemann | F16F 9/516 188/281 |
| 4,921,225 A * | 5/1990 | Ludwig | E05F 1/1292 188/269 |
| 5,620,066 A * | 4/1997 | Schuttler | E05C 17/30 188/300 |
| 5,624,105 A * | 4/1997 | Runkel | B60G 11/30 138/31 |
| 5,677,478 A * | 10/1997 | Murphy, Jr. | F16K 17/162 137/68.23 |
| 6,742,538 B1 | 6/2004 | Aderholt et al. | |
| 8,910,807 B2 * | 12/2014 | Wernecke | F16F 9/061 188/317 |
| 2003/0116897 A1 | 6/2003 | Knapp | |
| 2010/0263971 A1 * | 10/2010 | Lee | F16F 9/067 188/267.2 |
| 2010/0294736 A1 * | 11/2010 | Wernecke | B66C 23/92 212/293 |

OTHER PUBLICATIONS

Preliminary Report on Patentability dated Dec. 21, 2017, in International Application No. PCT/US16/36951.
International Search Report and Written Opinion dated Dec. 15, 2016, in International Application No. PCT/US16/36951.

* cited by examiner

FAST ACTING COMPRESSIBLE STOP

REFERENCE TO EARLIER FILED APPLICATIONS

The present application is a 371 National Phase application of PCT/US16/36951 filed Jun. 10, 2016 and titled Fast Acting Compressible Stop, which in turn claims priority to and the benefit of U.S. Provisional Patent Application Ser. No. 62/174,899 filed Jun. 12, 2015 and Fast Acting Compressible Stop, the disclosures of which are incorporated in their entirety by this reference.

BACKGROUND

The present invention relates to a compressible stop member for use on a crane, such as a fixed mast stop used on a mobile lifting crane, and particularly a fast-acting compressible stop member.

Lift cranes typically include a carbody; ground engaging members elevating the carbody off the ground; a rotating bed rotatably connected to the carbody such that the rotating bed can swing with respect to the ground engaging members; and a boom pivotally mounted on the rotating bed, with a load hoist line extending there from. For mobile lift cranes, the ground engaging members are moveable ground engaging members. There are different types of moveable ground engaging members, most notably tires for truck mounted cranes, and crawlers. Typically the mobile lift cranes include a counterweight to help balance the crane when the crane lifts a load.

A crane with a pivotable boom will typically include a mast which may be fixed or live. The mast provides a lateral offset from the base of the boom for connection of a crane suspension. A fixed mast will typically include a compressible stop member, often referred to as a mast stop, used to prevent the mast from rotating backwards when there is no load, or a light load on the boom. In normal conditions, the mast stop compresses slowly, but in the event of a sudden loss of weight on the boom, the mast stop must be able to compress quickly. Past mast stops typically included a spring so that the mast stop can engage the mast throughout a range of motion. The spring applies greater and greater force the further the mast stop is compressed. This compression provides a return force to support the mast. A conventional mast stop might be built with a tube inside of a tube, with a spring inside of the tubes. If the mast stop is compressed sufficiently, the spring would be compressed until it reached a solid height, thus greatly increasing the support of the mast stop.

While such mast stops have proven themselves to be adequate, they have a disadvantage in that the spring and tube arrangement cannot be easily scaled up in size due to physical limitations on the space available for the mast stop. For example, a larger crane that has higher capacities may not necessarily be proportionately larger in all dimensions. The larger crane will need a mast stop that can absorb more energy, but the space in which to deploy that mast stop may not be large enough to accommodate the larger spring and tube necessary for the mast stop. Additionally, the typical spring arrangement provides for a limited range of motion over which the mast stop supports the boom and the support that it does provide varies as the mast stop is compressed.

For larger cranes, mast stops have been developed that use hydraulics to provide an extended range of support. Hydraulic valves may be used to control the pressure of the hydraulic fluid in the mast stop. However, the flow rate of a hydraulic valve is directly related to the size of the valve. In order for a hydraulic compressible stop to compress at the same rate as a conventional spring-type compressible stop, the hydraulic compressible stop must use a large valve or multiple smaller valves. Once again, space becomes a problem, along with the added cost and complexity of the valves. Therefore, past mast stops using hydraulic valves may provide an extended range of support, but typically operate slowly, due to the limitations on the valves within the hydraulic compressible stop.

Thus there remains a need for a mast stop that can operate over a larger range of motion, providing a consistent amount of support like a hydraulic mast stop, while being able to be compressed quickly, like a conventional mast stop.

BRIEF SUMMARY

In one aspect a stop assembly for a crane is disclosed. The stop assembly includes a housing having an internal cavity, a first housing end, and a second housing end, the second end having a passageway into the internal cavity. A rod is slidably mounted within the housing and passes through the passageway and a first rod end is disposed within the internal cavity with a second rod end located external to the internal cavity. A floating piston divides the internal cavity into a gas portion biasing the floating piston towards the second housing end and a liquid portion. A valve assembly divides the liquid portion into a support portion and a reserve portion. The valve assembly includes a check valve allowing a liquid to flow from the reserve portion into the support portion, a pressure sensitive valve inhibiting the liquid from flowing from the support portion into the reserve portion when a liquid pressure is below a threshold pressure and allowing the liquid to flow from the support portion to the reserve portion when the liquid is above the threshold pressure, and a frangible divider configured to rupture when the liquid pressure exceeds a rupture pressure.

In some embodiments, the frangible divider is a rupture disk.

In some embodiments, the stop assembly further includes a sealable port in the housing providing access to the gas portion.

In some embodiments, one of the first housing end and the second rod end has a crane component engagement surface and the other of the first housing end and the second rod end is configured for pivotal attachment to a crane component.

In some embodiments, the stop assembly further includes a lateral support strut having a first end coupled to the housing and a second end configured to couple to a crane component.

In some embodiments, the gas portion contains a sealed volume of compressed gas.

In another aspect, a mobile crane is disclosed. The mobile crane includes a carbody, ground engaging members elevating the carbody off of the ground, at least one support column mounted on a rotating bed, and a compressible stop. The compressible stop includes a housing having an internal cavity, a first housing end, and a second housing end, the second end having a passageway into the internal cavity. A rod is slidably mounted within the housing and passes through the passageway and a first rod end is disposed within the internal cavity with a second rod end located external to the internal cavity. A floating piston divides the internal cavity into a gas portion biasing the floating piston towards the second housing end and a liquid portion. A valve assembly divides the liquid portion into a support portion and a reserve portion. The valve assembly includes a check valve allowing a liquid to flow from the reserve portion into the support portion, a pressure sensitive valve inhibiting the liquid from flowing from the support portion into the reserve portion when a liquid pressure is below a threshold pressure and allowing the liquid to flow from the support portion to the reserve portion when the liquid is above the threshold pressure, and a frangible divider configured to rupture when the liquid pressure exceeds a rupture pressure.

In some embodiments, at least one of the first crane component and the second crane component is selected from the group consisting of a mast, a boom, a gantry, and a rotating bed. In some embodiments, both the first crane component and the second crane component are support columns. In some embodiments, one of the first interface and the second interface is a rotating connection and the other of the first interface and the second interface comprises a U-shaped engagement surface.

In some embodiments, the frangible divider is a rupture disk.

In some embodiments, there is a sealable port in the housing providing access to the gas portion. In some embodiments, the gas portion is a sealed volume of compressed gas.

In some embodiments, the mobile crane further includes a lateral support strut having a first end coupled to the housing and a second end to the first crane component.

In another aspect, a method of allowing a support column pivotally mounted to a crane component to rotate beyond a normal stop position in response to a sudden load change is disclosed. The method includes providing a compressible stop including a housing, a rod, and a floating piston. The housing has an internal cavity, a first housing end, and a second housing end, the second end has a passageway into the internal cavity. The rod is slidably mounted within the housing and passes through the passageway and a first rod end is disposed within the internal cavity with a second rod end located external to the internal cavity. The floating piston divides the internal cavity into a gas portion biasing the floating piston towards the second housing end and a liquid portion. A valve assembly divides the liquid portion into a support portion and a reserve portion. The valve assembly includes a check valve allowing a liquid to flow from the reserve portion into the support portion, a pressure sensitive valve inhibiting the liquid from flowing from the support portion into the reserve portion when a liquid pressure is below a threshold pressure and allowing the liquid to flow from the support portion to the reserve portion when the liquid is above the threshold pressure, and a frangible divider configured to rupture when the liquid pressure exceeds a rupture pressure.

One of the first interface and the second interface is attached to one of the support column and the crane component. The support column is rotated towards the crane component until the other of the first interface and the second interface contacts the other of the support column and the crane component. The support column is rotated towards the crane component with the other of the first interface and the second interface in contact with the other of the support column and the crane component thereby compressing the compressible stop causing the pressure of the liquid in the support portion to reach the threshold pressure and to flow through the pressure sensitive valve into the reserve portion. The support column is towards the crane component with the other of the first interface and the second interface in contact with the other of the support column and the crane component, thereby compressing the compressible stop causing the pressure of the liquid in the support portion to exceed the rupture pressure rupturing the frangible divider.

In some embodiments, the method further includes inhibiting rotation of the support column towards the crane component with the compressible stop when the liquid pressure in the support section is below the threshold pressure.

In some embodiments, the method further includes rotating the support column away from the crane component, extending the first interface to maintain contact with the other of the support column and the crane component, and forcing the liquid through the check valve from the reservoir portion into the support portion. In some embodiments, the liquid is forced through the check valve by a pressurized gas in the gas section.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 1:
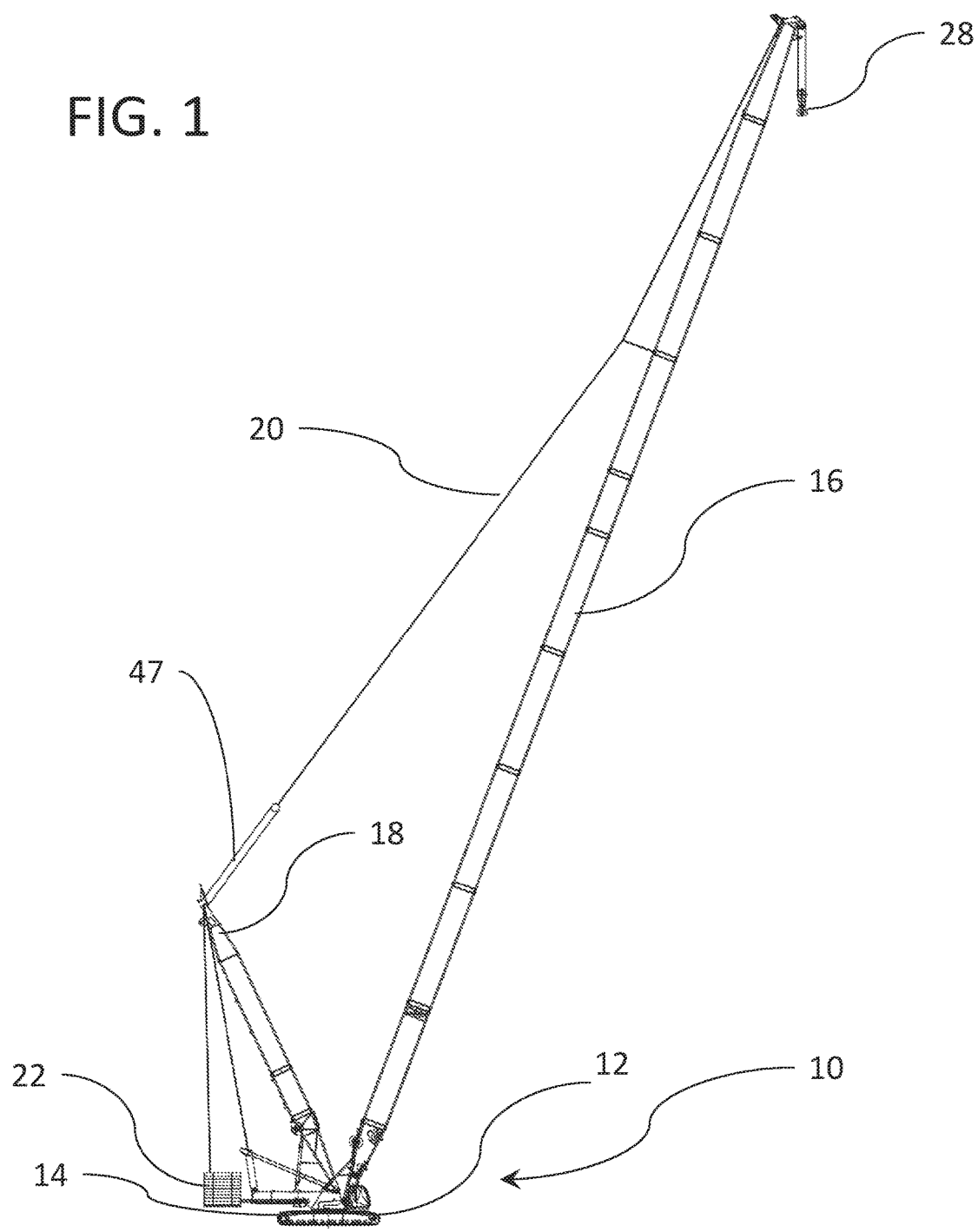
FIG. 1 illustrates a mobile crane.
Figure 2:
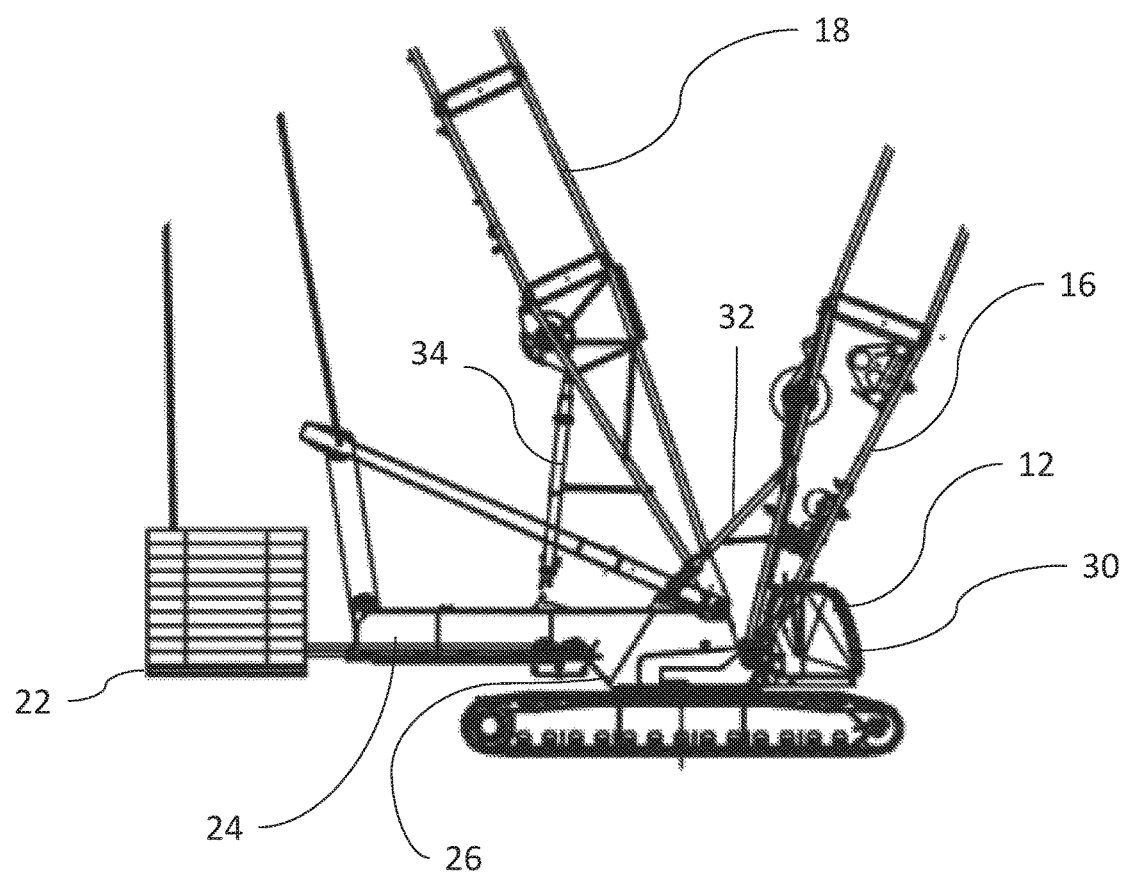
FIG. 2 illustrates an enlarged view of the rotating bed of the mobile crane of FIG. 1.

While the described embodiments will have applicability to many types of cranes, it will be described in connection with mobile lift crane 10, shown in an operational configuration in FIG. 1 and in an enlarged view in FIG. 2. The mobile lift crane 10 generally includes lower works and upper works. The lower works include a carbody 12 and moveable ground engaging members in the form of crawlers 14. The upper works include a rotating bed 24, support columns in the form of a boom 16 and a mast 18, boom suspension 20, and a counter weight assembly 22. There are two crawlers 14, one on either side of the crane 10, only one of which can be seen from the side views of FIG. 1 and FIG. 2. In the crane 10, the ground engaging members could be multiple sets of crawlers, one set of crawlers on each side. Of course additional crawlers than those shown can be used, as well-as other types of ground engaging members, such as tires.

The rotating bed 24 is mounted to the carbody 12 with a slewing ring 26, such that the rotating bed 24 can swing about an axis with respect to the ground engaging members 14. The rotating bed 24 supports the boom 16 pivotally mounted on a front portion of the rotating bed 24; the mast 18 mounted at its first end on the rotating bed 24; and the counterweight unit 22 unit is mounted to the rear of the rotating bed. The counterweight unit 22 may be in the form of multiple stacks of individual counterweight members on a support member.

The boom suspension 20 between the top of mast 18 and the boom 16 is used to control the boom angle and transfer load so that the counterweight unit 22 can be used to balance a load lifted by the crane 10. A load hoist line (not shown) is trained over a pulley (usually multiple sheaves in a sheave set) on the boom 16, supporting a hook 28. At the other end, the load hoist line is wound on a first main load hoist drum (not shown) connected to the rotating bed 24. The rotating bed 24 includes other elements commonly found on a mobile lift crane, such as an operator's cab 30, hoist drum for the boom hoist rigging 20, a second main hoist drum and an auxiliary load hoist.

The boom suspension 20 includes a boom hoist line in the form of wire rope wound on a boom hoist drum (not shown), and reeved through sheaves of an equalizer 47. The boom suspension 20 includes fixed length pendants connected between the boom top and an upper portion of the equalizer 47. The lower portion of the equalizer 47 is connected to the rotating bed 24 though the mast 18. This arrangement allows rotation of the boom hoist drum to change the amount of boom hoist line between the lower portion of the equalizer 47 and the upper portion of the equalizer 47, thereby changing the angle between the rotating bed 24 and the mast 18, which causes the boom 16 to move through the fixed length pendants.

The mobile crane 10 includes a boom stop 32 and a mast stop 34. The boom stop 32 and mast stop 34 prevent the respective crane components from rotating into a particular configuration and provide additional support. For example, boom stop 32 may prevent the boom 16 from rotating into a vertical position. Mast stop 34 may prevent the mast 18 from rotating towards the counterweight 22 when a load on the hook 28 is reduced. While mast 18 is fixed, during setup and operation, some degree of movement of the mast 18 is necessary for proper operation.

While the boom stop 32 and the mast stop 34 are each shown as a single member, preferably the crane 10 includes stop members in sets of two. However, each of the stop members in the set of two is nearly identical, and placed on the crane 10 such that only one of them can be seen from the side views of FIGS. 1 and 2. Further description of the stop members will be done in reference to a single mast stop 34, but it will be understood that multiple stop members may be used and the description is applicable to other stop members on the crane 10, both those explicitly called out in FIGS. 1 and 2, as well as other stop members which may not be explicitly illustrated in FIGS. 1 and 2.

Figure 3:
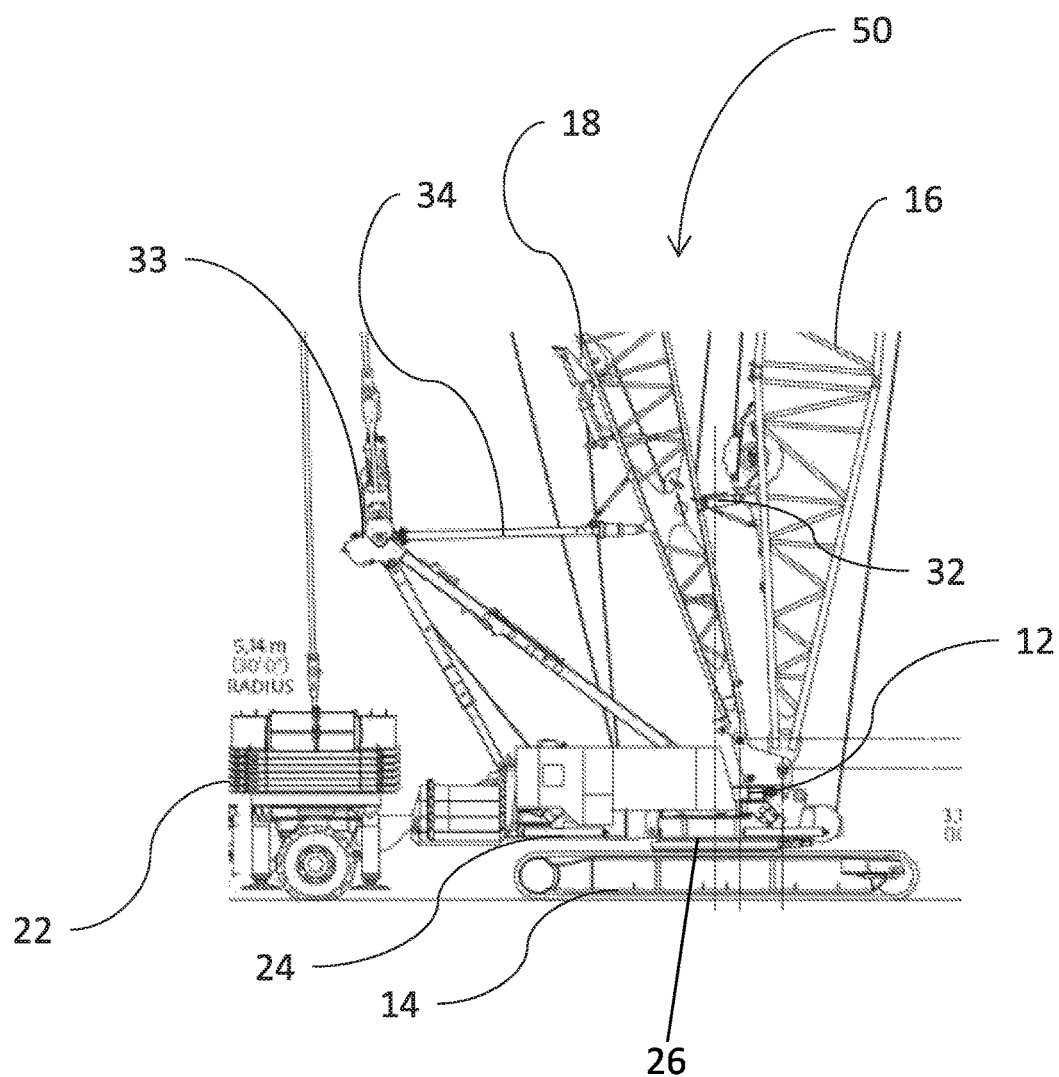
FIG. 3 illustrates another mobile crane having a compressible stop member.

FIG. 3 illustrates another embodiment of a mobile crane 50 showing an alternative mast stop 34 placement. The mobile lift crane 50 includes a carbody 12, crawlers 14, a boom 16, a mast 18, boom suspension (not shown), and a counter weight assembly 22. A rotating bed 24 is mounted to the carbody 12 with a slewing ring 26, such that the rotating bed 24 can swing about an axis with respect to the ground engaging members 14. The mobile crane 50 includes a boom stop 32 and a mast stop 34. The mast stop of FIG. 3 differs from the mast stop of FIG. 1 in that it does not interface with the rotating bed 24, and instead interfaces with a back hitch 33 of the mobile crane 50.

Figure 4:
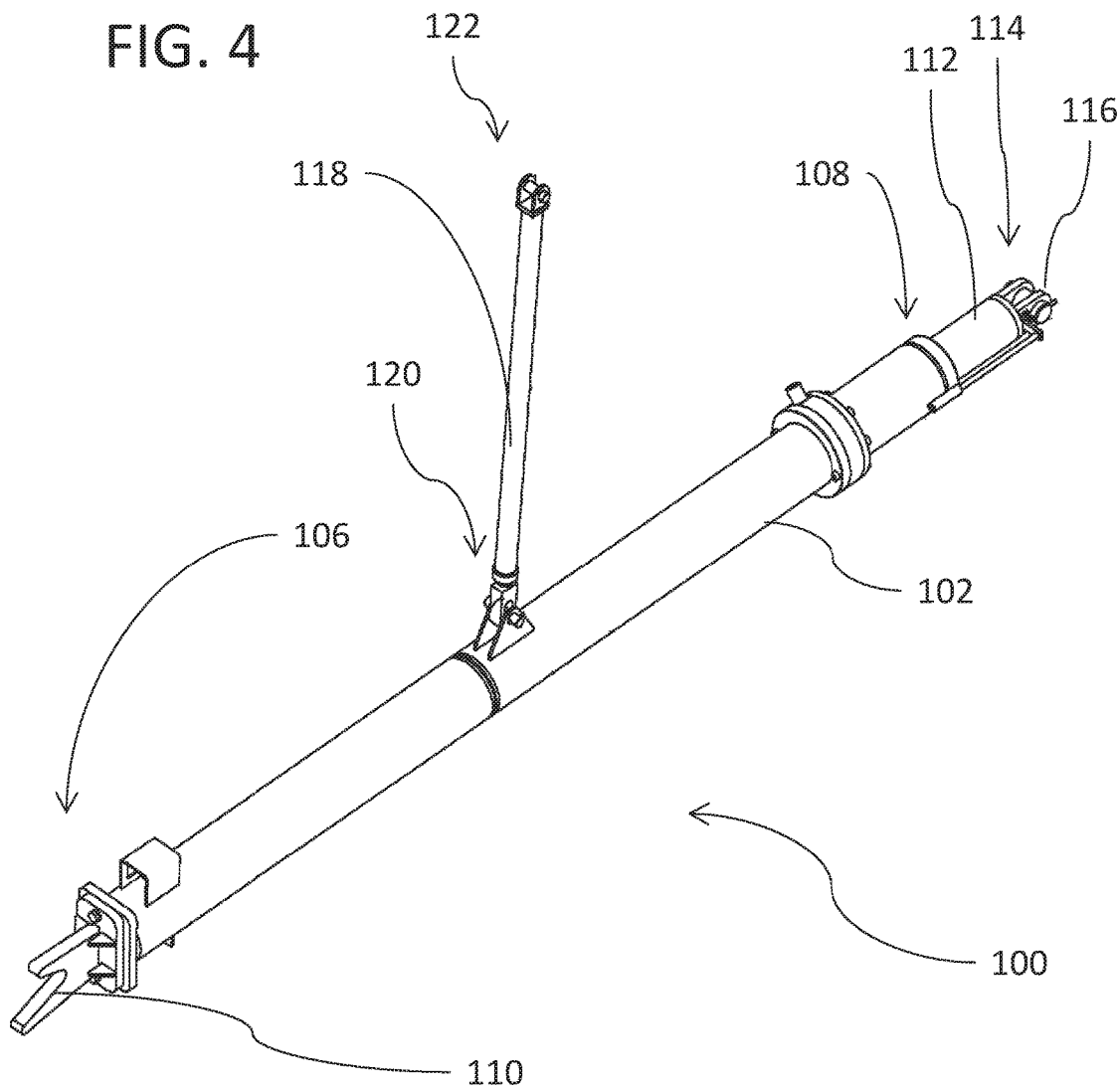
FIG. 4 illustrates an exemplary embodiment of a fast acting compressible stop.
Figure 5:
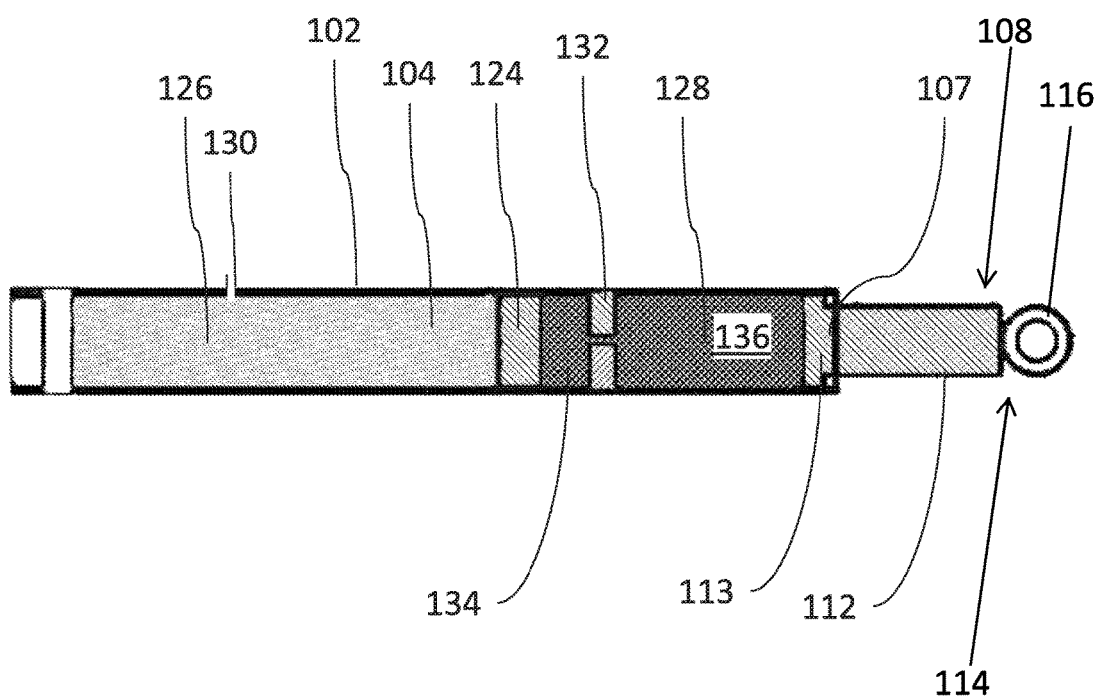
FIG. 5 illustrates a schematic sectional view of the second end of the compressible stop of FIG. 4.

FIG. 4 illustrates an exemplary embodiment of a compressible stop 100. FIG. 5 illustrates a sectional schematic of a portion of the compressible stop 100 of FIG. 4. The compressible stop 100 will be described in relation to FIG. 4 and FIG. 5. Compressible stop 100 is a mast stop 34, but may be used in other applications such as a boom stop or jib stop. Additionally, features of the described embodiment may be used in other stop members such as a boom stop, jib stop, or other stop members on a crane. The compressible stop 100 has an elongated housing 102 with an internal cavity 104 (visible in FIG. 5). A first end 106 of the elongated housing 102 is configured to interact with a first crane component and a second end 108 has a passageway 107 into the internal cavity 104. In the embodiment of FIG. 4, the housing 102 is cylindrical and the cavity 104 is cylindrical as well.

A rod 112 is slidably mounted within the housing 102 and passes through the passageway 107 at the second end 108 of the housing 102. A first end 113 of the rod 112 is disposed within the internal cavity 104 and a second end 114 of the rod 112 opposite the first end 113 is located external to the internal cavity 104. The first end 106 of the housing 102 and the second end 114 of the rod 112 each have an interface for interacting with a crane component. There are generally two different styles of interfaces that are used and a stop member typically includes one of each style. Other styles of interfaces are possible and these are merely two examples.

The first style of interface is exemplified by the first end 106 of the housing 102. The first style of interface includes a U-shaped member 110 having a support surface for interacting with a first crane component. The U-shaped member 110 is sized and shaped to receive a corresponding interface of a first crane component. For example, the first crane component could be the rotating bed 24 and the interface could be a horizontal cylinder offset from the crane component. When the first end 106 of the housing 102 is moved towards the first component, the interface will eventually contact the first crane component and prevent further movement of the interface relative to the crane component.

The second style of interface is exemplified by the second end 114 of the rod 112. The second end 114 of the rod 112 includes extensions 116, each of which has a hole for receiving a pin. The second interface may be coupled to a second crane component, such as a mast 16, by aligning the holes of the extensions 116 over a complementary hole on the second crane component and inserting a pin through the extensions 116. The pinned connection results in a pivoting connection in which the interface is pivotable about an axis of the pin.

The embodiment of FIG. 4 is shown with the first interface type on the first end 106 of the housing 102 and the second interface type on the second end 114 of the rod 112. However, in some embodiments the first end 106 of the housing 102 may have the second interface type and the second end 114 of the rod 112 may have the first interface type. For example, the first end 106 of the housing 102 could have a pinned connection for connection to a crane component such as a mast 16, and the second end 114 of the rod 112 could have a U-shaped member for engaging a rotating bed 24.

The housing 102 has an optional lateral support strut 118 for connection to a crane component for additional lateral stability. If one of the interfaces of the compressible stop 100 is rigid, or if the compressible stop 100 is support by some other means, the lateral support strut 118 is not necessary. A first end 120 of the lateral support strut 118 is coupled to the housing 102 and a second end 122 of the lateral support strut 118 is configured to couple to a crane component. For example, the first and second end 120, 122 may each have at least one extension with a pin hole for receiving a pin. The pin holes may be aligned with corresponding pin holes on crane components and pins inserted to secure the lateral support strut 118. In some embodiments, the lateral support strut 118 may itself be a compressible stop member.

As shown in FIG. 5, the housing 102 has a floating piston 124 that separates the internal cavity 104 into a gas portion 126 and a liquid portion 128. The floating piston 124 forms a fluid seal between the gas portion 126 and the liquid portion 128, so that fluid in the two portions 126, 128 does not flow past the floating piston 124 into the other portion 126, 128. A gas in the gas portion 126 is pressurized to bias the floating piston 124 towards the second end 108 of the housing 102. The bias may be increased or decreased by adjusting the gas pressure in the gas portion 126. A port 130 in a wall of the housing 102 provides access to the gas portion 126, allowing gas to be introduced or removed to adjust the pressure as necessary. Once the gas is at the desired pressure, the port 130 is closed, sealing the gas portion. In one embodiment, the gas portion 126 is pre-charged to two hundred pounds per square inch of pressure. The pressure of the gas in the gas portion 126 will vary in use, as the floating piston 124 changes the volume of the gas portion 126. In some embodiments, a conventional spring may be used in place of the compressed gas to provide the bias of the floating piston 124. The spring may be preloaded to provide a greater bias to the floating piston 124.

Figure 6:
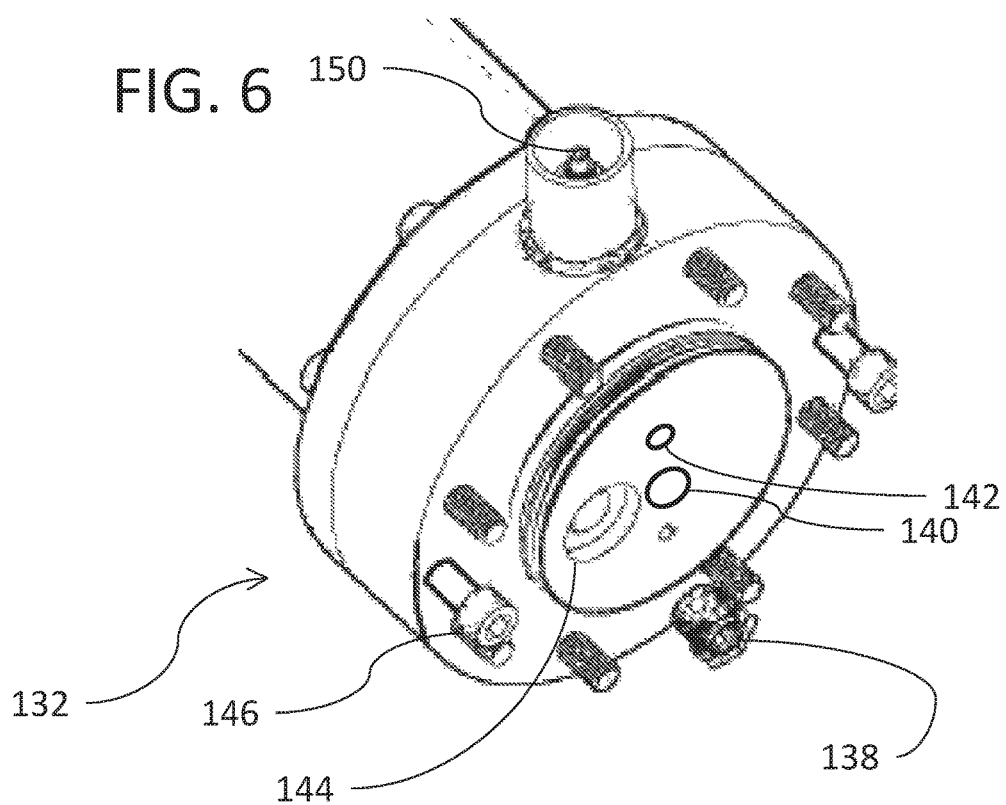
FIG. 6 illustrates an exemplary pressure sensitive valve assembly.

The liquid portion 128 contains a liquid such as hydraulic fluid. A valve assembly 132 divides the liquid portion 128 into a reservoir section, or reserve portion, 134 and a support section 136. The valve assembly 132, shown in detail in FIG. 6, contains a check valve and a pressure sensitive valve. The check valve prevents liquid flowing from the support section to the reservoir section, while allowing liquid to flow in the opposite direction. The pressure sensitive valve remains closed until a threshold pressure is reached, at which point it allows liquid to flow in either direction. In the embodiment of FIG. 6, the check valve and the pressure sensitive valve are combined into one sequence valve 133.

Figure 7:
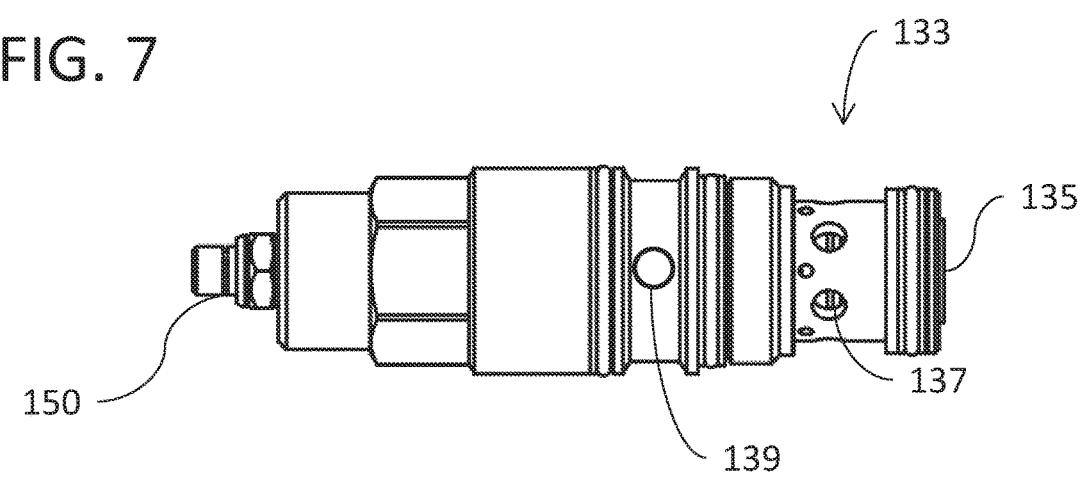
FIG. 7 illustrates an exemplary pressure sensitive valve.

FIG. 7 illustrates the sequencing valve 133 removed from the valve assembly 132. The sequencing valve 133 has an inlet 135 in fluid communication with the support section 136, an outlet 137 in fluid communication with the reservoir section 134, and a drain 139 in fluid communication with the reservoir section 134. The sequencing valve 133 has a built-in check valve, allowing liquid to flow from the outlet 137 to the inlet 135, but preventing liquid flowing from the inlet 135 to the outlet 137 until a threshold pressure differential between the inlet 135 and the drain 139 is reached. When the pressure differential between the drain 139 and the inlet 135 exceeds the threshold pressure, the sequencing valve 133 opens allowing liquid to flow from the inlet 135 to the outlet 137. If the pressure differential drops below the threshold pressure, the sequencing valve 133 closes, preventing further liquid flow from the inlet 135 to the outlet 137. The threshold pressure may be adjusted by turning an adjustment screw 150. In some embodiments, the threshold pressure is set at two-thousand three hundred pounds per square inch. Because the pressure in the reservoir section 134 is much lower than the pressure in the support section 136, the pressure differential is approximated using just the pressure in the support section 136. However, if greater accuracy is required, or if the pressure in the reservoir section 134 is not negligible, it may be used when calculating the threshold pressure.

Returning to FIG. 6, the sequencing valve 133 is placed in the valve assembly 132 perpendicular to the housing 102. The adjustment screw 150 is visible in FIG. 6, showing the orientation of the sequencing valve 133. The liquid may pass through the valve assembly 132 only through the sequence valve 133. In some embodiments, the function of the check valve and pressure sensitive valve may be performed by separate components, rather than a single sequencing valve 133 shown in FIG. 6. The outlet 137 of the sequencing valve 133 opens at port 140 in the valve assembly 132 and the drain 139 opens at port 142. The first end 113 of the rod 112 forms a liquid seal with the internal cavity 104 so that the liquid portion 128 is sealed within the internal cavity 104. The valve assembly 132 further contains a frangible divider between the reservoir section 134 and the support section 136 that ruptures when the pressure in the support portion 136 exceeds a rupture pressure.

Operation of the compressible stop 100 will be described in relation to FIGS. 4, 5, and 6. The compressible stop 100 generally has four operating configurations. The first configuration occurs when the compressible stop 100 is supporting a first component such as a mast 18 relative to a second component, the second configuration occurs when the first component is moving towards a second component, compressing the compressible stop 100, the third configuration occurs when the first component is moving away from the second component relieving the load on the compressible stop 100, and the fourth configuration occurs when the first component moves rapidly towards the second component causing the liquid to attempt to flow through the valve assembly 132 at a rate greater than a flow rate of the sequencing valve 133.

In the first configuration, the first end 106 of the housing 102, or the second end 114 of the rod 112 if the compressible stop 100 is reversed, is in contact with the second component and the second end 114 of the rod 112, or the first end 106 of the housing 102, is in contact with the first component. The compressible stop 102 supports the first component as long as the pressure in the support portion 136 does not exceed the threshold pressure of the pressure sensitive valve. Because the pressure sensitive valve only opens when the threshold pressure is exceeded, below the threshold pressure the support portion 136 is essentially incompressible and the compressible stop 100 acts as if it had a fixed length. For example, if the first end 114 of the rod 112 had cross sectional area of fifty square inches and the threshold pressure was two-thousand three hundred pounds per square inch, the compressible stop 100 would act as if it had a fixed length up to a compressive force of one hundred fifteen thousand pounds. In some embodiments, the pressure sensitive valve may have an adjustable threshold pressure, such that the compressive force required to compress the compressible stop 100 may be adjustable.

Once the compressive load on the compressible stop 100 causes the pressure in the support portion 136 to exceed the threshold pressure, the pressure sensitive valve begins to allow liquid to flow through the valve assembly 132 into the reservoir portion 134. This allows the support portion 136 to decrease in volume and the first end 113 of the rod 112 moves towards the valve assembly 132, decreasing the length of the compressible stop 100. The pressure within the support portion 136 remains at the threshold pressure so that the compressible stop 100 still provides a support to the first crane component. The liquid flowing through the pressure sensitive valve increases the amount of liquid in the reservoir portion 134. Because the liquid is incompressible, the only way for an increased amount of liquid to flow into the reservoir portion 134 is for the reservoir portion 134 to expand in volume. It does so by forcing the floating piston 124 towards the first end 106 of the housing 102, compressing the gas contained in the gas portion 126. The compressible stop 100 will continue to compress in length until the compressive force is reduced below the threshold amount or until the support portion 136 is essentially empty of liquid and the first end 113 of the rod 112 contacts the valve assembly 132 or some other hard stop.

In the third configuration, the crane component is moving away from the compressible stop 100, removing the load from the rod 112. The compressible stop 100 expands lengthwise to maintain contact between the first and second crane components up to the maximum extended length of the compressible stop 100. The check valve of the valve assembly 132 allows the liquid in the reservoir portion 134 to flow back into the support section 136 as the first end 113 of the rod 112 moves away from the valve assembly 132. The pressurized gas pressurizes the liquid in the reservoir portion 134 and the liquid flows through the check valve until the pressure in the support portion 136 equals the pressure in the reservoir portion 134. If the pressure is great enough, it will cause the rod 112 to extend from the housing 102, or the rod 112 may be pulled out of the housing 102 due to interactions with other crane components or gravity.

As the rod 112 extends, the compressible stop 100 maintains close contact with each of the crane components. When the first crane component is moved back towards the second crane component compressing the compressible stop 100 again, the check valve closes and the liquid in the support portion 136 once again inhibits the compression of the compressible stop 100, supporting the crane component in its new position.

In rare instances, the first component may be required to move rapidly towards the second crane component. For example, if a load is suddenly removed from the hook 28 on the boom 16, the mast 18 may be pulled towards the counterweight. This rapid movement may exceed the flow rate of the pressure sensitive valve; causing a buildup of pressure in the support portion 136. The pressure builds up until it reaches the rupture pressure as determined by the frangible divider. In some embodiments, the rupture pressure is six thousand pounds per square inch. Once the rupture pressure is reached, the frangible divider breaks, opening an additional passage between the support portion 136 and the reservoir portion 134. The additional passage allows the liquid to rapidly pass through the valve assembly 132 and the compressible stop 100 is able to compress rapidly, beyond the rate allowed by the pressure sensitive valve. In some embodiments the flow rate of the pressure sensitive valve is sixty gallons per minute and the flow rate of the rupture disk after rupture is five hundred gallons per minute.

Figure 8:
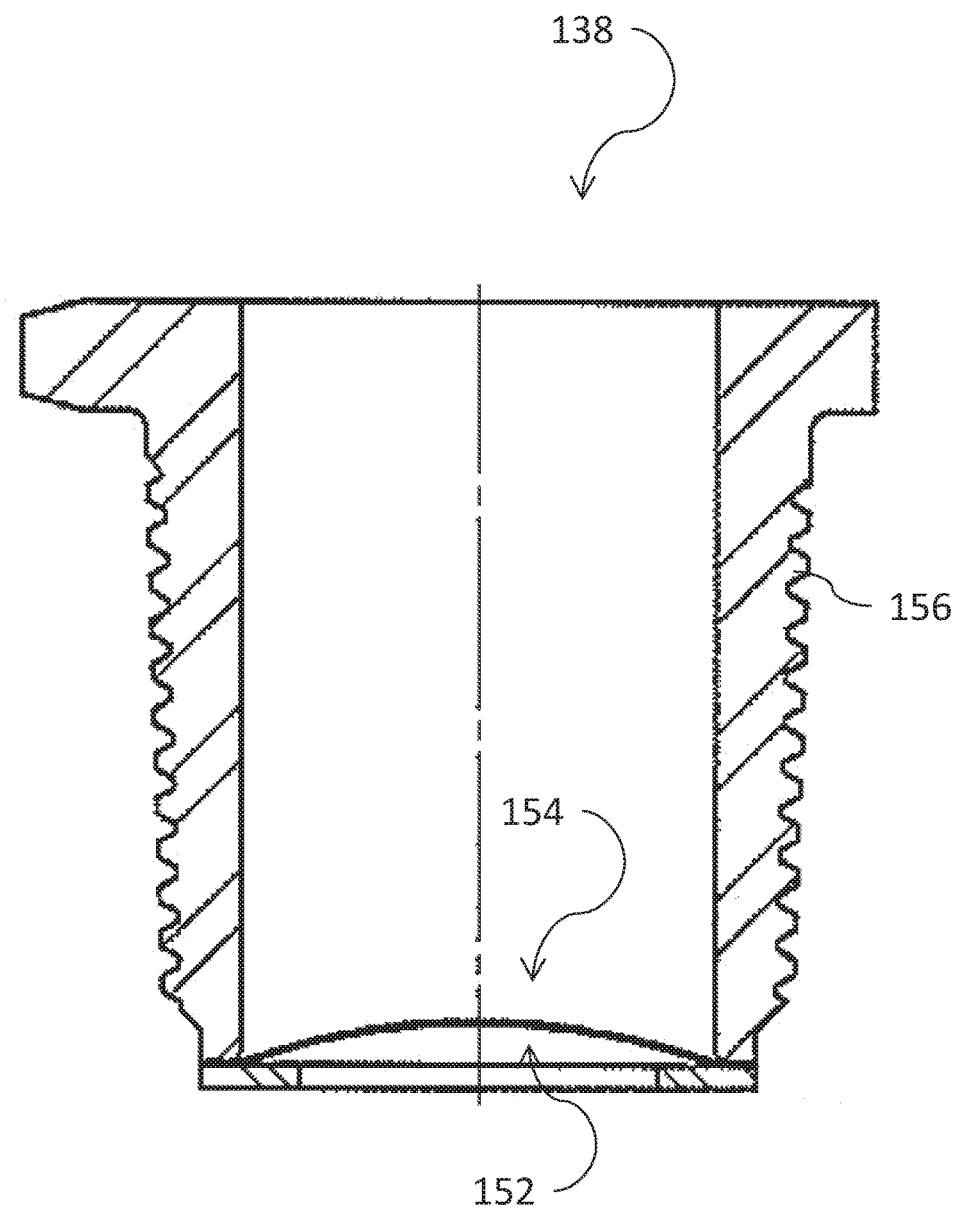
FIG. 8 illustrates an exemplary rupture disk.

FIG. 6 illustrates an embodiment of a valve assembly 132 having a check valve 142, a pressure sensitive valve 140, and a frangible divider in the form of a rupture disk 138 (shown removed). FIG. 8 illustrates a cross section of the rupture disk 138. When the pressure differential between a first side 152 of the rupture disk 138 and a second side 154 of the rupture disk 138 is exceeded, the rupture disk 138 fails, allowing liquid to flow from the first side 152 to the second side 154.

Referring to FIGS. 6 and 8, the valve assembly 132 has a through hole 144 sized to receive the rupture disk 138. The through hole 144 has a portion with an internal thread, and the rupture disk 138 has an external thread 156 complementary to the internal thread of the through hole 144. The rupture disk 138 is installed by threading it into the through hole 144 for normal operation of the valve assembly 132. The valve assembly 132 is coupled to the housing 102 through threaded fasteners 146. The housing 102 may be dismantled by removing the threaded fasteners 146 to access the valve assembly 132. In the event the rupture disk 138 has ruptured, it may be replaced by threading a new rupture disk 138 in its place.

It should be understood that various changes and modifications to the presently preferred embodiments described herein may be made. For example, the first and second crane members need not be a boom and a jib. For example, the first crane member could be the rotating bed of the crane. Additionally, in some embodiments the angle at which the gravity actuated mechanism changes configurations may be other than horizontal. Such changes and modifications can be made without departing from the spirit and scope of the present invention and without diminishing its intended advantages. It is therefore intended that such changes and modifications be covered by the appended claims.

The invention claimed is:

1. A stop assembly for a crane, the stop assembly comprising:
   a housing having an internal cavity, a first housing end, and a second housing end, the second end having a passageway into the internal cavity;
   a rod slidably mounted within the housing and passing through the passageway, a first rod end disposed within the internal cavity, and a second rod end located external to the internal cavity;
   a floating piston dividing the internal cavity into a gas portion biasing the floating piston towards the second housing end, and a liquid portion;
   a valve assembly dividing the liquid portion into a support portion and a reserve portion, the valve assembly comprising a check valve allowing a liquid to flow from the reserve portion into the support portion, a pressure sensitive valve inhibiting the liquid from flowing from the support portion into the reserve portion when a liquid pressure is below a threshold pressure and allowing the liquid to flow from the support portion to the reserve portion when the liquid pressure is above the threshold pressure, and a frangible divider configured to rupture when the liquid pressure exceeds a rupture pressure.

2. The stop assembly of claim 1, wherein the frangible divider comprises a rupture disk.

3. The stop assembly of claim 1, further comprising a sealable port in the housing providing access to the gas portion.

4. The stop assembly of claim 1, wherein one of the first housing end and the second rod end comprises a crane component engagement surface and the other of the first housing end and the second rod end is configured for pivotal attachment to a crane component.

5. The stop assembly of claim 1, further comprising a lateral support strut having a first end coupled to the housing and a second end configured to couple to a crane component.

6. The stop assembly of claim 1, wherein the gas portion comprises a sealed volume of compressed gas.

7. The stop assembly of claim 1, wherein the valve assembly is coupled to the housing.

8. A mobile crane comprising:
   a carbody;
   ground engaging members elevating the carbody off of the ground;
   at least one support column mounted on a rotating bed;
   a compressible stop comprising:
      a housing having an internal cavity, a first housing end having a first interface interfacing with a first crane component, and a second housing end having a passageway into the internal cavity;

a rod slidably mounted within the housing and passing through the passageway, a first rod end disposed within the internal cavity, and a second rod end located external to the internal cavity and having a second interface for interfacing with a second crane component;

a floating piston dividing the internal cavity into a gas portion biasing the floating piston towards the second housing end, and a liquid portion;

a valve assembly dividing the liquid portion into a support portion and a reserve portion, the valve assembly comprising a check valve allowing a liquid to flow from the reserve portion into the support portion, a pressure sensitive valve inhibiting the liquid from flowing from the support portion into the reserve portion when a liquid pressure is below a threshold pressure and allowing the liquid to flow from the support portion to the reserve portion when the liquid pressure is above the threshold pressure, and a frangible divider configured to rupture when the liquid pressure exceeds a rupture pressure.

9. The mobile crane of claim 8, wherein at least one of the first crane component and the second crane component is selected from the group consisting of a mast, a boom, a gantry, and the rotating bed.

10. The mobile crane of claim 8, wherein both the first crane component and the second crane component comprise a support column.

11. The mobile crane of claim 8, wherein one of the first interface and the second interface comprises a rotating connection and the other of the first interface and the second interface comprises a U-shaped engagement surface.

12. The mobile crane of claim 8, wherein the frangible divider comprises a rupture disk.

13. The mobile crane of claim 8, further comprising a sealable port in the housing providing access to the gas portion.

14. The mobile crane of claim 8, further comprising a lateral support strut having a first end coupled to the housing and a second end to the first crane component.

15. The mobile crane of claim 8, wherein the gas portion comprises a sealed volume of compressed gas.

16. A method of allowing a support column pivotally mounted to a crane component to rotate beyond a normal stop position in response to a sudden load change, the method comprising:

providing a compressible stop comprising:

a housing having an internal cavity, a first housing end having a first interface interfacing with a first crane component, and a second housing end having a passageway into the internal cavity;

a rod slidably mounted within the housing and passing through the passageway, a first rod end disposed within the internal cavity, and a second rod end located external to the internal cavity and having a second interface for interfacing with a second crane component;

a floating piston dividing the internal cavity into a gas portion biasing the floating piston towards the second housing end, and a liquid portion;

a valve assembly dividing the liquid portion into a support portion and a reserve portion, the valve assembly comprising a check valve allowing a liquid to flow from the reserve portion into the support portion, a pressure sensitive valve inhibiting the liquid from flowing from the support portion into the reserve portion when a liquid pressure is below a threshold pressure and allowing the liquid to flow from the support portion to the reserve portion when the liquid pressure is above the threshold pressure, and a frangible divider configured to rupture when the liquid exceeds a rupture pressure;

attaching one of the first interface and the second interface to one of the support column and the crane component;

rotating the support column towards the crane component until the other of the first interface and the second interface contacts the other of the support column and the crane component;

rotating the support column towards the crane component with the other of the first interface and the second interface in contact with the other of the support column and the crane component thereby compressing the compressible stop causing the pressure of the liquid in the support portion to reach the threshold pressure and to flow through the pressure sensitive valve into the reserve portion; and rotating the support column towards the crane component with the other of the first interface and the second interface in contact with the other of the support column and the crane component thereby compressing the compressible stop causing the pressure of the liquid in the support portion to exceed the rupture pressure rupturing the frangible divider.

17. The method of claim 16, further comprising inhibiting rotation of the support column towards the crane component with the compressible stop when the liquid pressure in the support portion is below the threshold pressure.

18. The method of claim 16, further comprising:

rotating the support column away from the crane component;

extending the first interface to maintain contact with the other of the support column and the crane component; and forcing the liquid through the check valve from the reservoir portion into the support portion.

19. The method of claim 18, wherein the liquid is forced through the check valve by a pressurized gas in the gas portion.

* * * * *